US008630161B2

(12) United States Patent
Moorti et al.

(10) Patent No.: US 8,630,161 B2
(45) Date of Patent: *Jan. 14, 2014

(54) METHOD AND SYSTEM FOR MULTI-ANTENNA PREAMBLES FOR WIRELESS NETWORKS PRESERVING BACKWARD COMPATIBILITY

(75) Inventors: Rajendra Tushar Moorti, Mountain View, CA (US); Christopher Young, Cupertino, CA (US); Carlos Aldana, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,676

(22) Filed: Aug. 16, 2011

(65) Prior Publication Data
US 2011/0299611 A1 Dec. 8, 2011

Related U.S. Application Data

(63) Continuation of application No. 11/021,266, filed on Dec. 23, 2004, now Pat. No. 8,000,223.

(60) Provisional application No. 60/561,346, filed on Apr. 12, 2004.

(51) Int. Cl.
*H04J 11/00* (2006.01)

(52) U.S. Cl.
USPC .............................. 370/208; 370/203

(58) Field of Classification Search
USPC .................... 370/208, 203, 210, 206, 207
See application file for complete search history.

(56) References Cited

U.S. PATENT DOCUMENTS

| 6,850,481 | B2 | 2/2005 | Wu et al. |
| 7,136,434 | B2 | 11/2006 | Hwang |
| 2002/0041635 | A1 | 4/2002 | Ma et al. |
| 2004/0233838 | A1 | 11/2004 | Sudo et al. |
| 2005/0141407 | A1 | 6/2005 | Sandhu |
| 2005/0286474 | A1 | 12/2005 | van Zelst et al. |

*Primary Examiner* — Dady Chery
(74) *Attorney, Agent, or Firm* — Garlick & Markison; Kevin L. Smith

(57) ABSTRACT

A method for processing a wireless signal includes performing by one or more processors, selecting a plurality of training sequences from a preamble of the wireless signal. Each of the selected plurality of training sequences may include a plurality of energy tones. The selected plurality of training sequences from the preamble may be shifted, in time domain, to generate a plurality of subsequent preambles for transmission. Each of the generated plurality of subsequent preambles may include the plurality of energy tones. The preamble may include a legacy preamble and/or an 802.11(n) preamble. The shifting in the time domain may include circular shifting. The circular shifting may include forward circular shifting and/or backwards circular shifting.

42 Claims, 7 Drawing Sheets

METHOD AND SYSTEM FOR MULTI-ANTENNA PREAMBLES FOR WIRELESS NETWORKS PRESERVING BACKWARD COMPATIBILITY

CROSS-REFERENCE TO RELATED APPLICATIONS/INCORPORATION BY REFERENCE

This application makes reference to, claims priority to, and claims the benefit of U.S. application Ser. No. 11/021,266, filed Dec. 23, 2004, now issued as U.S. Pat. No. 8,000,223, on Aug. 16, 2011, which makes reference to, claims priority to, and claims the benefit of U.S. Provisional application Ser. No. 60/561,346 filed Apr. 12, 2004, and entitled "Method and System for Multi-Antenna Preambles for Wireless LANS Preserving Backward Compatibility to 802.11a/g Standards," now expired, which applications are incorporated herein by reference in their entirety.

This application also makes reference to U.S. application Ser. No. 11/050,505, filed Feb. 03, 2004, now issued as U.S. Pat. No. 7,515,581, on Apr. 7, 2009, which is hereby incorporated herein by reference in its entirety.

FIELD OF THE INVENTION

Certain embodiments of the invention relate to the transmission of signals from multiple antennas. More specifically, certain embodiments of the invention relate to a method and system for multi-antenna preambles for wireless networks preserving backward compatibility.

BACKGROUND OF THE INVENTION

In a wireless communication system, a data stream will most likely experience multiple reflections (multipath) while propagating between the transmitter and the receiver. Multipath fading refers to a phenomenon, in which a transmitted signal is reflected by various obstacles within a transmission medium, which causes the transmitted signal to traverse a plurality of different transmit paths within the transmission medium. The transmitted signal in each of the multipaths reaches a receiving antenna at different times since each multipath possesses a different time delay. With advancements in communication technologies, wireless communication systems that originally utilized a single transmit antenna and a single receive antenna, may now use multiple antennas at the transmission end and/or at the receiver end to improve signal detection. Wireless communication systems which rely on multiple transmit and/or receiver antennas may utilize one or more packet preambles to facilitate signal detection and further signal processing.

In a conventional frequency-sparse packet preamble systems, large errors may occur in the power estimates of received signals, especially for channels that possess long delay-spreads. Moreover, the number of disjoint sets of tones which may be used is limited by the total number of tones available in a legacy preamble. Additionally, conventional frequency-sparse packet preamble systems may require multiple signal carriers for operation, which may increase the complexity of associated circuitry and also increases cost of implementation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for processing multiple preambles for a wireless signal. Aspects of the method may comprise selecting a portion of a preamble, and shifting the selected portion of the preamble to generate a plurality of subsequent preambles. The preamble may comprise a legacy preamble and/or an 802.11(n) preamble. The selected portion of the preamble may comprise a short training sequence. The shifting may comprise circular shifting. The circular shifting may comprise forward circular shifting and/or backwards circular shifting. The generated plurality of subsequent preambles may be transmitted via a plurality of antennas. A phase roll may be added to the selected portion of the preamble to generate the plurality of subsequent preambles. The delayed time signal $x(t\,t_0)$, whether cyclic or not, may also be acquired by multiplying its Fourier transform signal $X(f)$ by $e^{j2\pi f t_0}$, thus generating the phase roll.

Another embodiment of the invention may provide a machine-readable storage, having stored thereon, a computer program having at least one code section executable by a machine, thereby causing the machine to perform the steps as described above for processing multiple preambles for a wireless signal.

Aspects of the system for processing multiple preambles for a wireless signal may comprise at least one processor that selects a portion of a preamble and shifts the selected portion of the preamble to generate a plurality of subsequent preambles. The preamble may comprise a legacy preamble and/or an 802.11(n) preamble. The shifting may comprise circular shifting. The selected portion of the preamble may comprise a short training sequence with a determined length. For example, for an 802.11a/g system, each short training sequence may comprise an 800 ns sequence. The generated plurality of subsequent preambles may be transmitted by the processor via a plurality of antennas. The circular shifting may comprise forward circular shifting and/or backwards circular shifting. A phase roll may be added by the processor to the selected portion of the preamble to generate the plurality of subsequent preambles.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for generating multiple antenna preambles, which may be utilized in wireless LANs so as to preserve backward compatibility with legacy standards such as 802.11a/g. In one aspect of the invention, a set of packet preambles for data transmission over multiple antennas may be created by circularly time-shifting a legacy preamble, for example, 802.11a/g. Future wireless communication systems may utilize a set of circularly shifted preambles provided by the invention for transmission from multiple antennas, which may assert carrier detection of existing legacy devices such as, for example, devices operating in 802.11a/g standards. In this manner, legacy devices may be adapted to carry out all preamble processing, for example, frequency offset estimation, antenna diversity selection, and/or timing acquisition. The circularly shifted preambles provided by the invention may also be utilized to provide an estimate of received power for gain control across multiple-antenna receivers.

In an exemplary aspect of the invention, circularly shifted preambles may be applied to any multiple-transmit packet-based communication system using a preamble. The use of circularly shifted preambles may also be extended to an arbitrary number of transmit antennas because the time-shifts for each of the antennas may be arbitrary. Accordingly, circularly shifted preambles may be applied to single-carrier (SC) systems as well as to multi-carrier (MC) systems, for example, orthogonal frequency division multiplexing (OFDM) type systems. This approach may be applied to legacy systems which utilize multiple preambles across multiple antennas. For example, a larger set of preambles for a new higher-order antenna system may be constructed by circularly shifting each of the legacy preambles. Circular shifts may be replaced by pure delays, which may be accomplished by, for example, delaying the preambles by sending zeros followed by the legacy preamble.

Figure 1A:
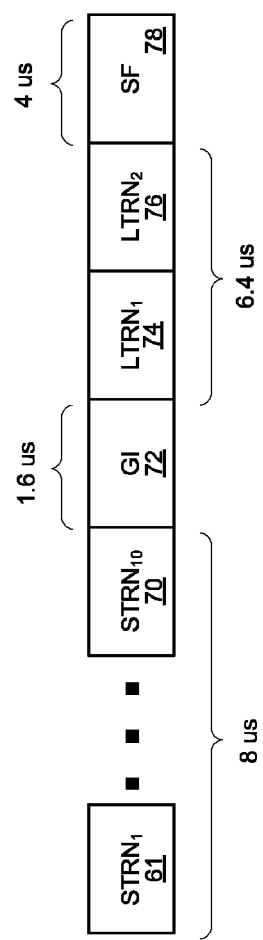
FIG. 1A is a diagram illustrating an exemplary 802.11a/g preamble that may be utilized in accordance with an embodiment of the invention.

FIG. 1A is a diagram illustrating an exemplary 802.11a/g preamble that may be utilized in accordance with an embodiment of the invention. Referring to FIG. 1A, the exemplary 802.11a/g preamble 50 may comprise ten short training (STRN) sequences, 61 through 70, two long training (LTRN) sequences, 74 and 76, and a signal field (SF) 78. The STRN sequences 61 through 70, and the LTRN sequences 74 and 76 may be separated by a guard interval (GI) 72. Each STRN sequence 61through 70 may be 800 ns in duration, each LTRN sequence 74 and 76 may be 3.2 us in duration, the signal field 78 may be 4 us in duration, and the guard interval 72 may be 1.6 us in duration. A legacy preamble, such as preamble 50, therefore, may be a total of 20 us in duration. In one aspect of the invention, each of the STRN sequences 61 through 70may be jointly circularly shifted by the same amount to generate one or more circularly shifted preambles, which may be utilized in a multiple-transmit packet-based communication system, for example. The LTRN sequence within a legacy preamble may be utilized for channel estimation of one or more wireless channels utilized during signal transmission. The signal field within an exemplary legacy preamble may indicate data rate of transmission and/or length of remaining data being transmitted after a preamble.

Figure 1B:
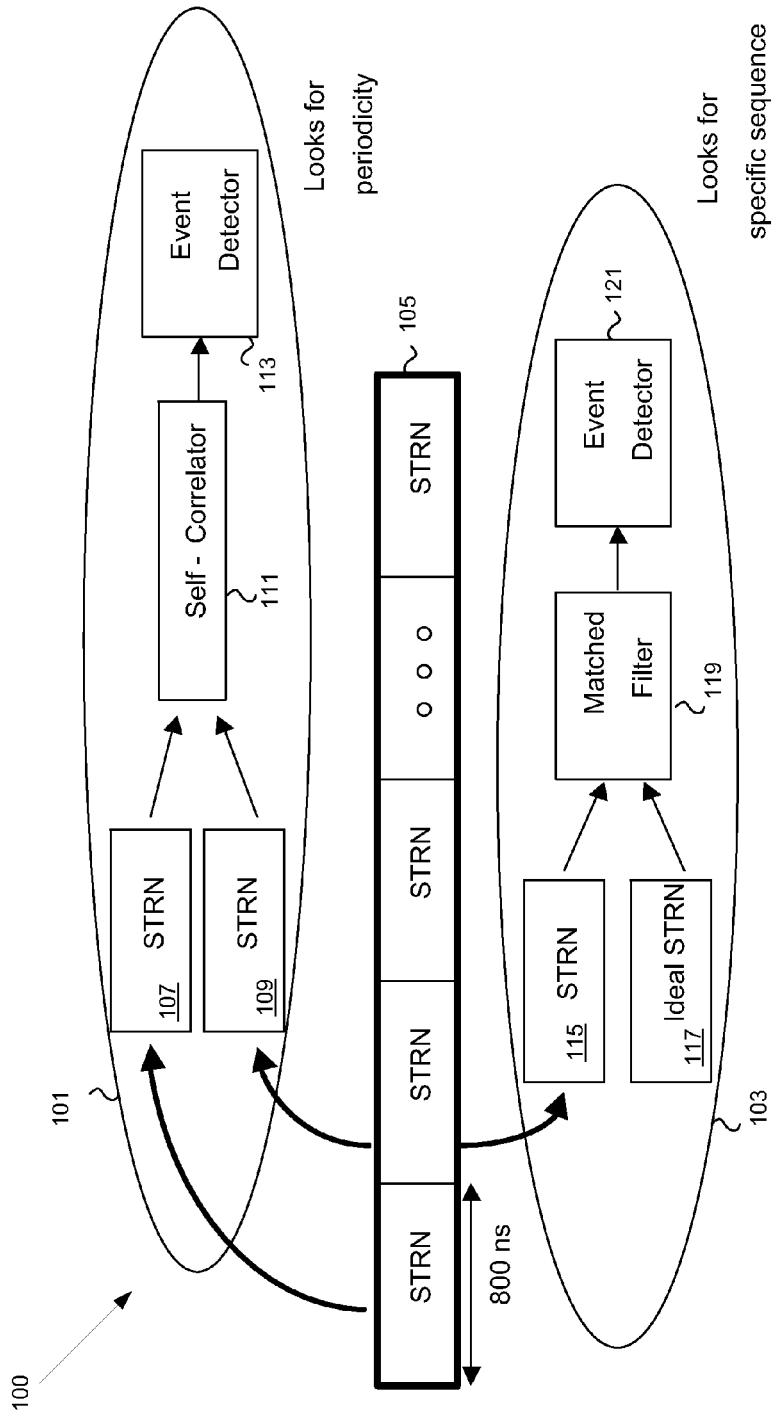
FIG. 1B is a diagram illustrating an exemplary 802.11a/g preamble portion that may be utilized in accordance with an embodiment of the invention.

FIG. 1B is a diagram 100 illustrating an exemplary 802.11a/g preamble portion that may be utilized in accordance with an embodiment of the invention. Referring to FIG. 1B, there is illustrated a portion of a legacy preamble 105 and methods 101 and 103 for carrier detection estimation utilizing the preamble portion 105. The legacy preamble portion 105 may comprise a plurality of short training (STRN) sequences each 800 ns in duration. An STRN sequence, such as the STRN sequence 105, may be utilized within a wireless signal processing system for automatic gain control and frequency offset estimation between a transmitter and a receiver of a wireless signal.

Within an exemplary wireless communication system, a periodicity method 101 and/or a specific sequence method 103 may be utilized with the received preamble portion 105 to detect a preamble between a transmitter and a receiver of a wireless signal. For example, if a periodicity method 101 is selected for carrier detection, a self-correlator 111 and an event detector 113 may be utilized to detect periodicity of a received preamble. Two STRN sequences 107 and 109 from the received preamble portion 105, may be correlated by the self-correlator 111. The event detector 113 may be adapted to acquire the correlated output of the self-correlator 111 and detect the STRN sequence periodicity within the preamble portion 105. For example, the event detector 113 may be adapted to detect that each STRN sequence is 800 ns in duration. As a result, the entire preamble portion 105, or an entire preamble, may be detected.

Similarly, a specific sequence method 103 may also be utilized with the received preamble portion 105 to detect a preamble and generate a frequency offset estimate between a transmitter and a receiver of a wireless signal. For example, if a specific sequence method 103 is selected for carrier detection, a matched filter 119 and an event detector 121 may be utilized to detect a specific sequence within the received preamble portion 105. An STRN sequence 115, from the received preamble portion 105, may be compared with a determined, or ideal, STRN sequence 117 by the matched filter 119. The event detector 121 may be adapted to acquire the matched output from the matched filter 119 and detect a match between the STRN sequence 115 and the ideal STRN sequence 117. As a result, the entire preamble portion 105, or an entire preamble, may be detected.

In an exemplary aspect of the invention, a circularly shifted preamble for use in an 802.11n wireless signal processing system, for example, may be utilized for carrier detection in accordance with a periodicity method and/or a specific sequence method, as described with regard to FIG. 1. In this manner, a circularly shifted preamble for 802.11n wireless signal that may be utilized in accordance with a periodicity method and/or a specific sequence method, may also be utilized for carrier detection and/or other preamble processing by legacy devices, such as 802.11a/g wireless devices.

Figure 2:
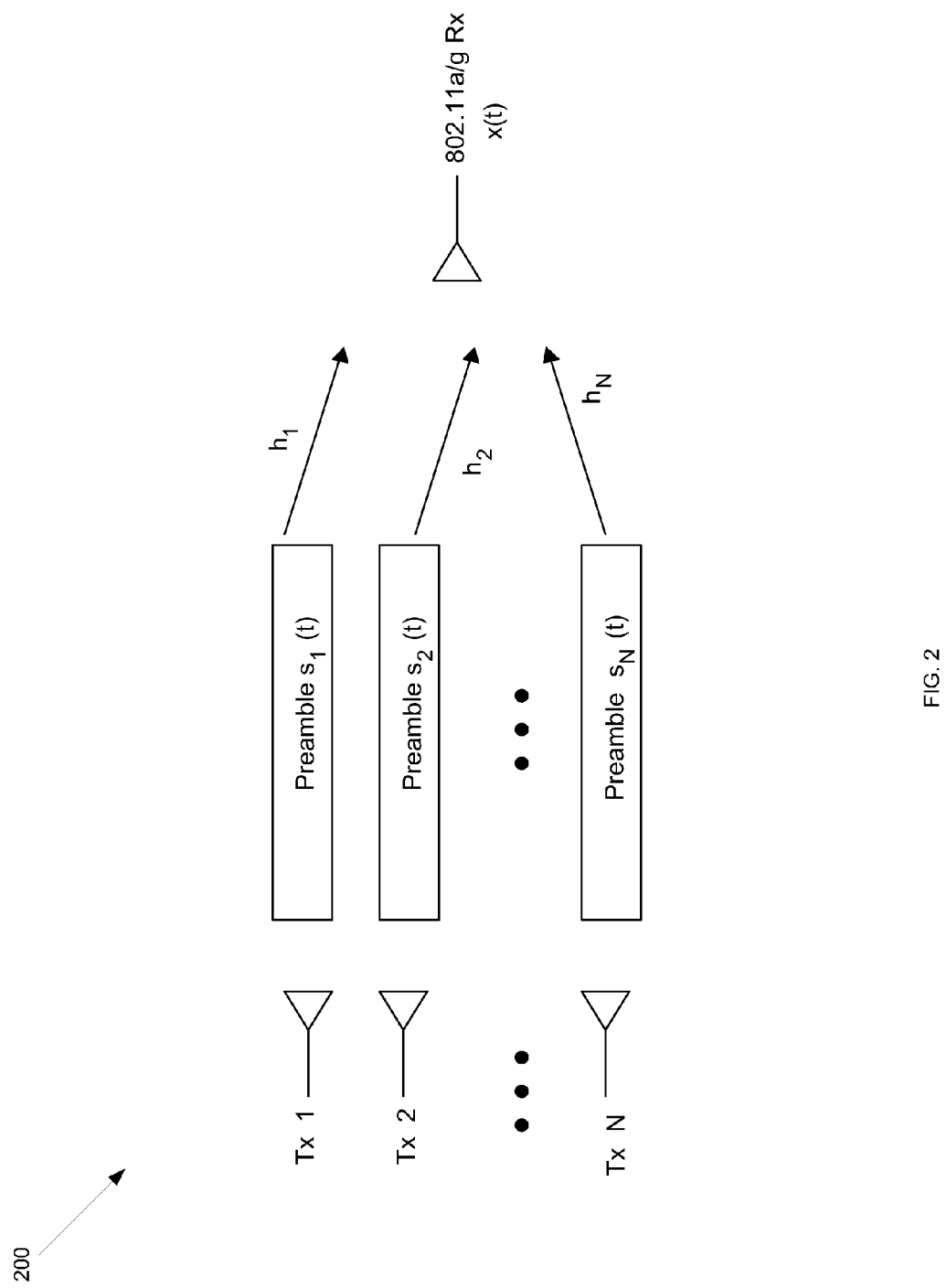
FIG. 2 is a diagram illustrating the transmission of a set of 802.11a/g preambles from multiple antennas within a wireless communication system that may be utilized in accordance with an embodiment of the invention.

FIG. 2 is a diagram 200 illustrating the transmission of a set of 802.11a/g preambles from multiple antennas within a wireless communication system that may be utilized in accordance with an embodiment of the invention. Referring to FIG. 2, during legacy carrier detection, the 802.11a/g receiver station Rx may receive a composite signal x(t). A total of "N" transmit antennas, Tx1 through TxN, may be utilized to transmit preambles $s_1$ through $s_N$, respectively. Each of the "N" transmit antennas Tx1 through TxN may utilize wireless channels with transfer functions $h_1$ through $h_N$, respectively. The composite signal x(t) received by the receiver station Rx may be represented as a sum of convolutions of preambles and corresponding channel transfer functions. Ignoring noise, the composite signal may, therefore, be represented by the equation:

$$x(t)=(h_1*s_1)(t)+(h_2*s_2)(t)+\ldots+(h_N*s_N)(t).$$

This composite signal may have characteristics, such as periodicity, similar to the characteristics of legacy 802.11a/g preamble as outlined with regard to FIG. 1. Since each channel transfer function $h_i(t)$ may be arbitrary, the composite received signal x(t) may be periodic if each preamble $s_i(t)$ has spectral energy only at certain tones. In an exemplary aspect of the invention, a circularly shifted preamble which may be utilized with a legacy 802.11a/g device as well as with an 802.11n device, may comprise a plurality of spectral energy tones at multiples of 1.25 MHz. In this manner, a circularly shifted preamble for an 802.11n device may be assured to be compliant with a legacy 802.11a/g device. Accordingly, when supp$\{h_i(t)\}<=800$ ns and $s_i(t)=s_i(t-800 \text{ ns})$, then x(t)=x(t-800 ns) and preamble compatibility between 802.11a/g legacy devices and 802.11n devices may be assured. Further, for legacy carrier detection by an 802.11a/g device, the composite signal x(t) received by the receiver Rx may be required to be as similar to each preamble function s(t) as possible in order to facilitate matched-filter based detection. In this regard, an output of the matched filter may be represented by the equation:

$$s*(-t)*x(t)=h_1*(s*(-t)*s_1)(t)+h_2*(s*(-t)*s_2)(t)+\ldots+h_N*(s*(-t)*s_N)(t).$$

Figure 3:
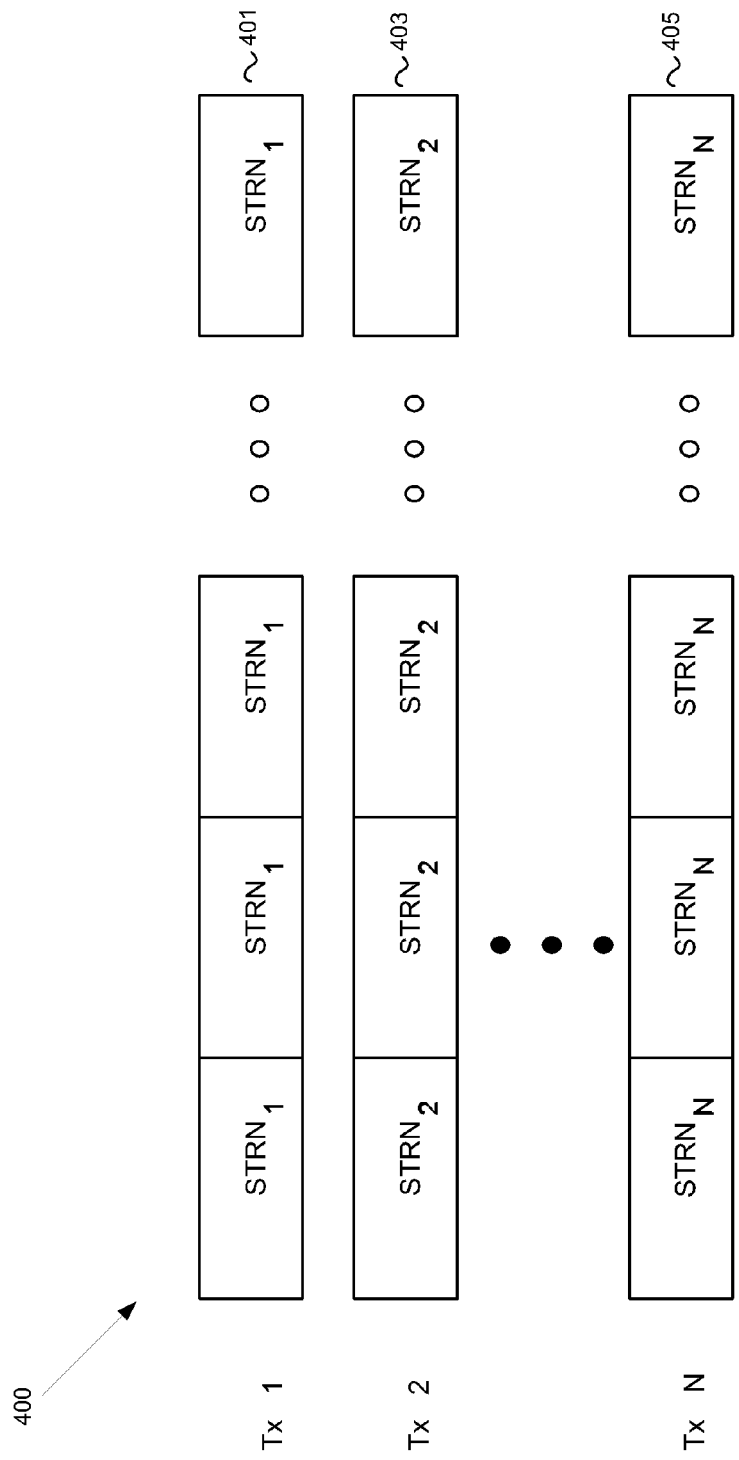
FIG. 3 is a diagram illustrating the use of circular time shifts for multi-antenna legacy preamble transmission, in accordance with an embodiment of the present invention.

FIG. 3 is a diagram 400 illustrating the use of circular time shifts for multi-antenna legacy preamble transmission, in accordance with an embodiment of the present invention. Referring to FIG. 3, a wireless signal processing system may utilize circular time shifts of legacy 802.11a/g standard STRN sequence, for example, to generate a plurality of subsequent preambles for use with a plurality of transmit antennas. For example, a legacy $STRN_1$ sequence may be utilized for preamble portion 401 for antenna Tx1. The preamble portion 401 may comprise ten $STRN_1$ sequences, where each $STRN_1$ sequence may comprise a determined number of spectral energy tones. For example, an STRN sequence in an 802.11a/g system may comprise 12 spectral energy tones. In an exemplary aspect of the invention, a portion of the $STRN_1$ sequence may be circularly shifted for a determined number of times to generate a plurality of STRN sequences, $STRN_2, \ldots STRN_N$. The $STRN_2$ sequence may then be utilized to generate the preamble portion 403 for the antenna Tx2 and the $STRN_N$ sequence may be utilized to generate the preamble portion 405 for the antenna TxN.

Accordingly, by circularly shifting portions of the legacy preamble $STRN_1$, subsequent preambles with the same periodicity as the legacy preamble $STRN_1$ may be generated. Each of the preambles 401 through 405 may be characterized by a determined number of active spectral energy tones, such as 12 energy tones for an 802.11a/g system, in each of the STRN sequence but with different phase shift between each preamble portion 401 through 405. The STRN sequences may, therefore, be represented by the following equation:

$$STRN_i(t)=STRN_1((t-T_i) \bmod L),$$

where L may represent the period of the legacy preamble $STRN_1$, for example, 800 ns for legacy 802.11a/g standard. In another exemplary aspect of the invention, a two-antenna transmission system may use circular shifts of 0 ns and 400 ns, while a four-antenna transmission system, for example, may use circular shifts of 0 ns, 200 ns, 400 ns, and 600 ns. Other circular shifts may also be utilized for shifting portions of the legacy preamble $STRN_1$.

Figure 4:
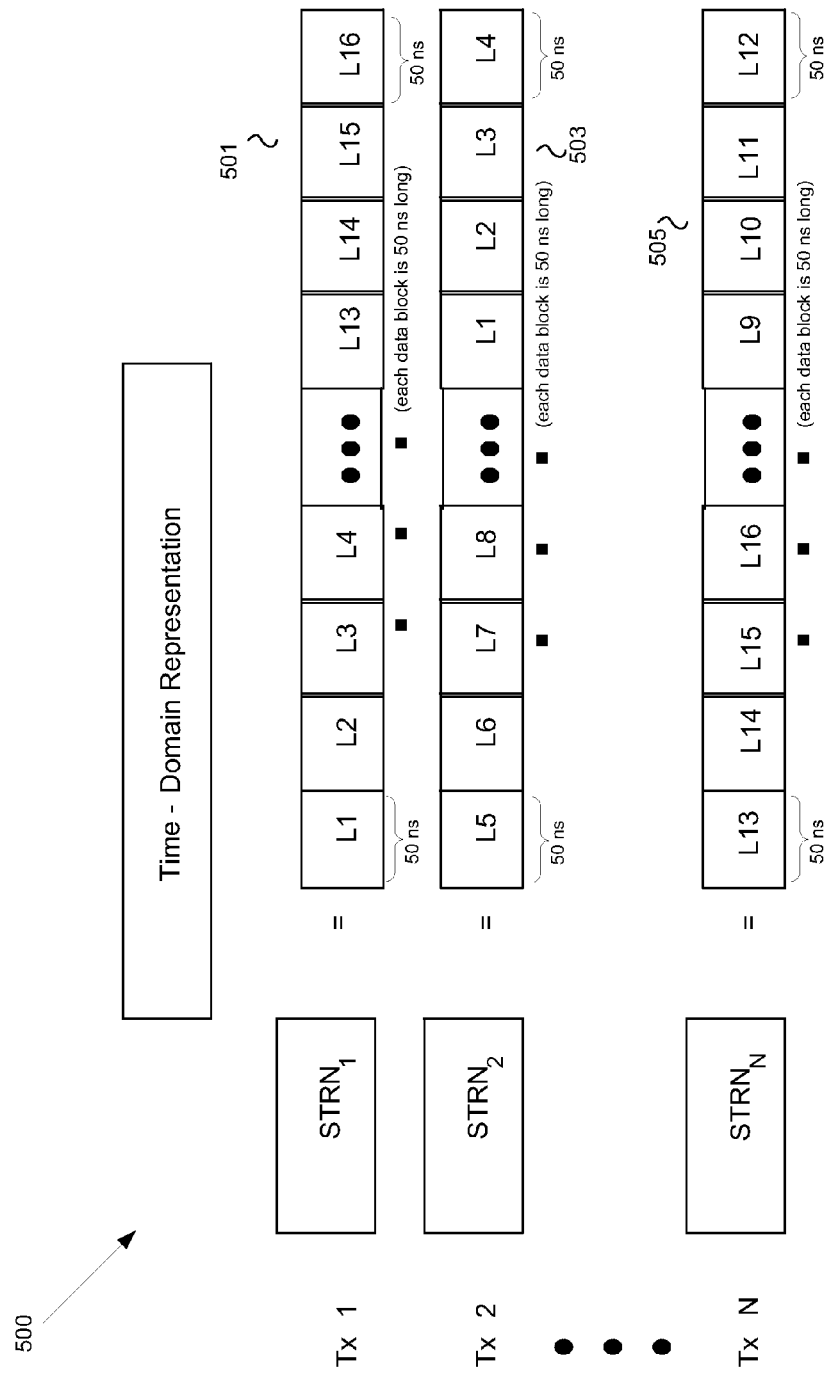
FIG. 4 is a diagram illustrating the time domain representation of circular time shifts for multi-antenna legacy preamble transmission, in accordance with an embodiment of the present invention.

FIG. 4 is a diagram 500 illustrating the time domain representation of circular time shifts for multi-antenna legacy preamble transmission, in accordance with an embodiment of the present invention. Referring to FIG. 4, in the time domain representation of the circular time shifts, a wireless signal processing system may utilize circular time shifts of legacy 802.11a/g standard STRN sequence, for example, to generate a plurality of subsequent preambles for use with a plurality of transmit antennas. For example, a legacy $STRN_1$ sequence may be utilized for the preamble portion 501 for the antenna Tx1. The preamble portion 501, as represented in time-domain, may comprise a plurality of data blocks. In one aspect of the invention, the legacy $STRN_1$ sequence may comprise sixteen data blocks, L1 through L16, where each block may be 50 ns long. FIG. 4 illustrates an exemplary cyclic forward shifts in time domain representation.

A portion of the $STRN_1$ sequence 501 may be circularly shifted forward or backwards to generate the $STRN_2$ sequence 503 for antenna Tx2. For example, the data blocks L1 through L4 may be circularly shifted and transferred at the end of the $STRN_1$ sequence 501, thus generating $STRN_2$ sequence 503 comprising data blocks $\{L5, \ldots, L16, L1, L2, L3, L4\}$. The $STRN_1$ sequence 501 may then be circularly shifted again to generate the $STRN_3$ preamble portion for antenna Tx3 (not pictured). In this manner, all STRN sequences may be generated by subsequent circular shifts of the $STRN_1$ sequence 501. Accordingly, a portion of the $STRN_1$ sequence 501 may be circularly shifted to generate the $STRN_N$ sequence 505 for antenna TxN. The $STRN_N$ sequence 505 may then be utilized to generate a preamble for antenna TxN.

By circularly shifting portions of the legacy preamble comprising the $STRN_1$ sequence 501, subsequent STRN sequences, with the same periodicity as the legacy $STRN_1$ sequence, may be generated. Each STRN sequence 501 through 505 may be characterized by a determined number of active spectral energy tones, such as 12 energy tones for an 802.11a/g system, but with different phase roll between corresponding preambles. The delayed time signal $x(t-t_0)$, whether cyclic or not, may also be acquired by multiplying its Fourier transform signal X(f) by $e^{j2\pi f t_0}$, thus generating the phase roll. The $STRN_1$ sequence 501 may be utilized as the legacy preamble and subsequent circularly shifted sequences $STRN_i(t)$ may be represented by the equation:

$$STRN_i(t)=STRN_1((t-T_i) \bmod 800 \text{ ns}),$$

where 800 ns may represent the period of the legacy $STRN_1$ sequence 501. Each resulting subsequent STRN sequence may be a time-rotated version of legacy STRN sequence, such as the $STRN_1$ sequence 501, and may allow full preamble processing, such as carrier detection and/or gain control by a legacy 802.11a/g and/or an 802.11n device.

Although FIG. 4 illustrates the time domain representation of forward circular time shifts for multi-antenna legacy preamble transmission, the present invention may not be so limited. In this regard, backward circular time shifts may also be utilized for multi-antenna legacy preamble transmission.

Figure 5:
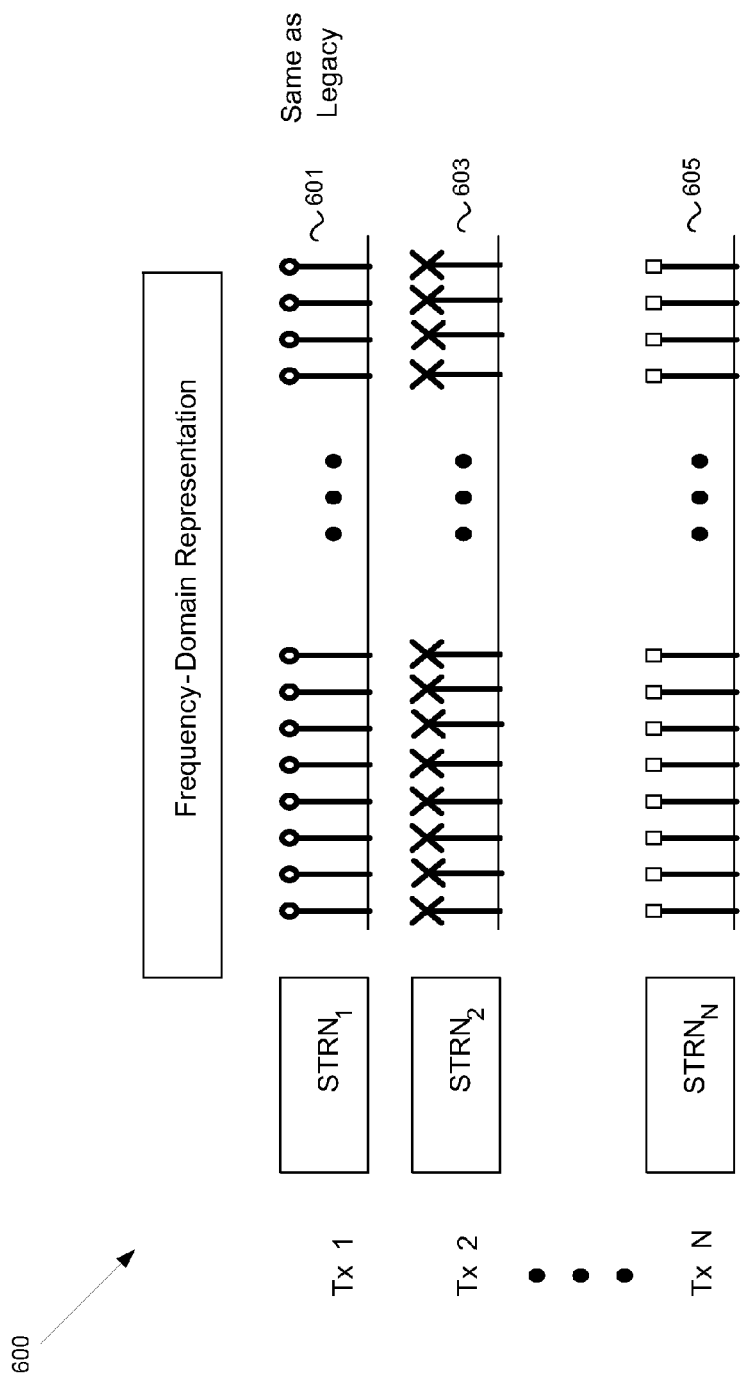
FIG. 5 is a diagram illustrating the frequency domain representation of circular time shifts for multi-antenna legacy preamble transmission, in accordance with an embodiment of the present invention.

FIG. 5 is a diagram 600 illustrating the frequency domain representation of circular time shifts for multi-antenna legacy preamble transmission, in accordance with an embodiment of the present invention. Referring to FIG. 5, in the frequency domain representation of the circular shifts, a wireless signal processing system may utilize circular time shifts of legacy 802.11a/g standard STRN sequence, for example, to generate a plurality of subsequent preambles for use with a plurality of transmit antennas. For example, a legacy $STRN_1$ sequence 601 may be utilized for a preamble for antenna Tx1. The $STRN_1$ sequence 601, as represented in frequency-domain, may comprise a plurality of active spectral energy tones. In one aspect of the invention, the legacy $STRN_1$ sequence 601 may comprise a determined number of active spectral energy tones, such as 12 energy tones for an 802.11a/g system.

In accordance with an embodiment of the invention, a portion of the $STRN_1$ sequence 601 may be circularly shifted for a determined number of times to generate a plurality of STRN sequences, $STRN_2, \ldots, STRN_N$ for antennas Tx2, . . . , TxN, respectively. The $STRN_2$ sequence 603 may also comprise a plurality of active spectral energy tones, for example 12 energy tones for an 802.11a/g system, but with different phase roll resulting from the circular shift of the $STRN_1$ sequence 601. The $STRN_1$ sequence 601 may be utilized to generate the $STRN_3$ sequence for antenna Tx3 (not pictured), as well as any remaining STRN sequences. In this regard, a portion of the $STRN_1$ sequence 601 may be circularly shifted to generate the $STRN_N$ sequence 605 for antenna TxN and the $STRN_N$ sequence 605 may be utilized to generate a preamble for antenna TxN. The $STRN_N$ sequence 605 may comprise a determined number of active spectral energy tones, such as 12 energy tones for an 802.11a/g system, but with different phase roll compared to the legacy $STRN_1$ sequence 601, resulting from the circular shift of the $STRN_1$ sequence 601.

By circularly shifting portions of the legacy preamble comprising $STRN_1$ sequence 601, subsequent STRN sequences, with the same periodicity as the legacy $STRN_1$ sequence 601, may be generated. Each STRN sequence 601 through 605 may be characterized by a determined number of active spectral energy tones, such as 12 energy tones for an 802.11a/g system, but with different phase shift between corresponding preambles resulting from the circular time shifts. The $STRN_1$ sequence 601 may be utilized as the legacy preamble and subsequent circularly shifted sequences $STRN_i(t)$ may be represented by the equation:

$STRN_i(t)=STRN_1((t-T_i) \bmod 800 \text{ ns})$, where 800 ns may represent the period of the legacy $STRN_1$ sequence 601. Each subsequent STRN sequence may be a time-rotated version of a legacy STRN sequence, such as the $STRN_1$ sequence 601, and may allow for full preamble processing, such as carrier detection and/or gain control by a legacy 802.11a/g and/or an 802.11n device.

Figure 6:
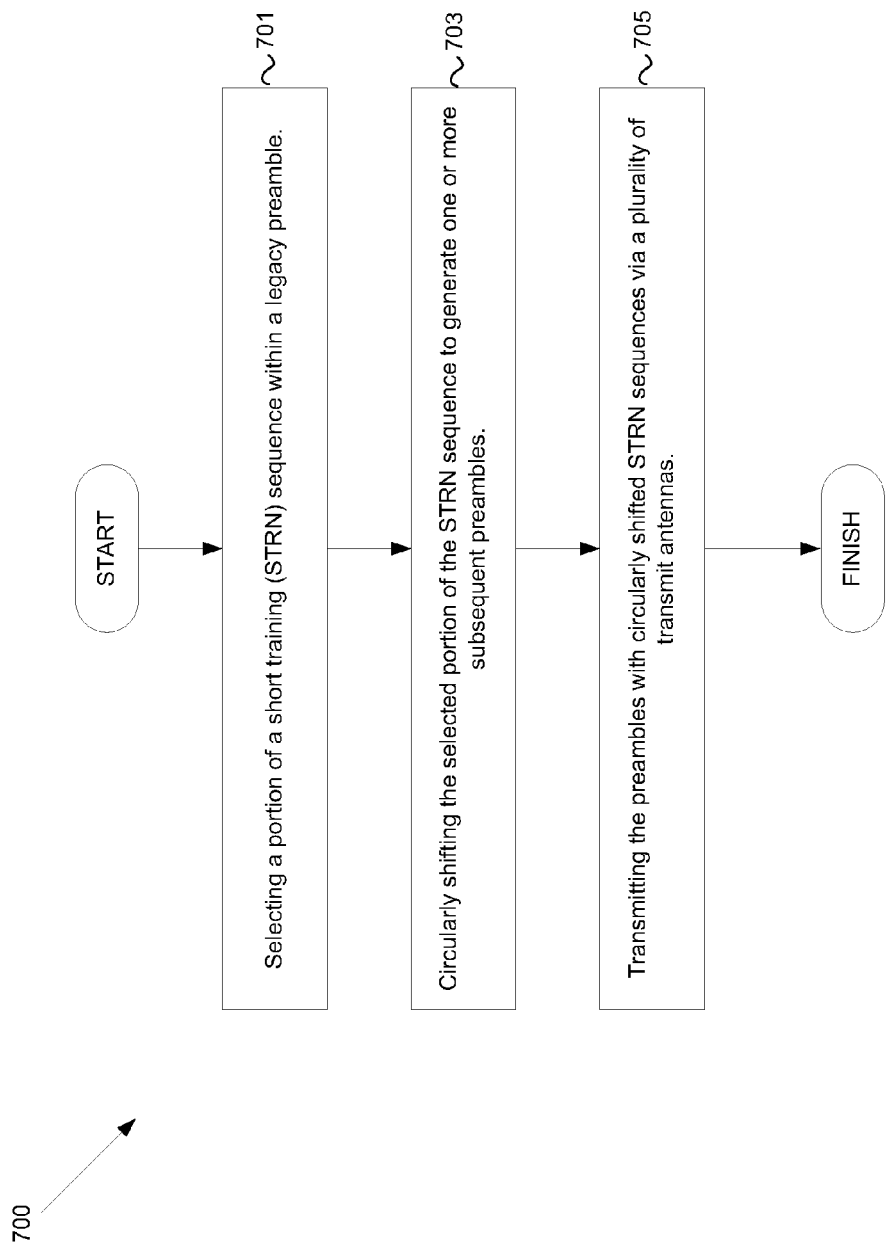
FIG. 6 is a flow diagram of an exemplary method for processing multiple preambles for a wireless signal, in accordance with an embodiment of the invention.

FIG. 6 is a flow diagram 700 of an exemplary method for processing multiple preambles for a wireless signal, in accordance with an embodiment of the invention. Referring to FIG. 6, at 701, a portion of a short training (STRN) sequence within a legacy preamble may be selected. At 703, the selected portion of the STRN sequence may be circularly shifted to generate one or more subsequent preambles. At 705, the preambles with circularly shifted STRN sequences may be transmitted via a plurality of transmit antennas.

In an exemplary aspect of the invention, a circularly shifted preamble approach may be applied to legacy systems, which use multiple preambles across multiple antennas. However, the present invention may not be limited in this manner. A larger set of preambles for a new higher-order antenna system, for example, may also be constructed by circularly shifting each of the legacy preambles. In addition, circular shifting may comprise shifting one or more symbols and/or tones from a front portion of a preamble to the back of the preamble. However, the present invention may not be limited in this manner. Circular shifting may, therefore, comprise shifting one or more symbols and/or tones from a back portion of a preamble to the front of the preamble.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a wireless signal, the method comprising:
    performing by one or more processors:
        selecting a plurality of training sequence data blocks from a preamble of the wireless signal, each of said selected plurality of training sequence data blocks including a plurality of energy tones; and
        cyclic shifting, in time domain, said selected plurality of training sequence data blocks from said preamble to generate a plurality of subsequent preambles for transmission by at least two of a plurality of antennas, wherein each of said generated plurality of subsequent preambles includes said plurality of energy tones.

2. The method according to claim 1, wherein said preamble comprises a legacy preamble.

3. The method according to claim 1, wherein said preamble comprises an 802.11(n) preamble.

4. The method according to claim 1, wherein said cyclic shifting in said time domain comprises circular shifting.

5. The method according to claim 4, wherein said circular shifting comprises forward circular shifting.

6. The method according to claim 4, wherein said circular shifting comprises backwards circular shifting.

7. The method according to claim 1, comprising transmitting said generated plurality of subsequent preambles via a plurality of antennas.

8. The method according to claim 7, wherein said generated plurality of subsequent preambles is transmitted in one or more substantially identical frequencies in each of said plurality of antennas.

9. The method according to claim 8, wherein each of said generated plurality of subsequent preambles is transmitted in substantially identical periodicity in each of said plurality of antennas.

10. The method according to claim 1, wherein said cyclic shifting comprises code for shifting of data blocks within said selected at least a portion of said preamble.

11. The method according to claim 1, wherein said selected portion of said preamble comprises a long training sequence.

12. The method according to claim 1, wherein each of said generated plurality of subsequent preambles corresponds to one or more spectral energy tone.

13. The method according to claim 1, comprising adding a phase roll to said selected at least a portion of said preamble to generate said plurality of subsequent preambles.

14. A system for processing multiple preambles for a wireless signal, the system comprising:
   at least one processor that selects a plurality of training sequence data blocks from a preamble of the wireless signal, each of said selected plurality of training sequence data blocks including a plurality of energy tones; and
   said at least one processor cyclically shifts in time domain, said selected plurality of training sequence data blocks to generate a plurality of subsequent preambles for transmission by at least two of a plurality of antennas, wherein each of said generated plurality of subsequent preambles including said plurality of energy tones.

15. The system according to claim 14, wherein said preamble comprises a legacy preamble.

16. The system according to claim 14, wherein said preamble comprises an 802.11(n) preamble.

17. The system according to claim 14, wherein said cyclic shift in said time domain comprises circular shifting.

18. The system according to claim 17, wherein said circular shifting comprises forward circular shifting.

19. The system according to claim 17, wherein said circular shifting comprises backwards circular shifting.

20. The system according to claim 14, wherein said at least one processor transmits said generated plurality of subsequent preambles via a plurality of antennas.

21. The system according to claim 20, wherein said generated plurality of subsequent preambles is transmitted in one or more substantially identical frequencies in each of said plurality of antennas.

22. The system according to claim 21, wherein each of said generated plurality of subsequent preambles is transmitted in substantially identical periodicity in each of said plurality of antennas.

23. The system according to claim 14, wherein said at least one processor adds a phase roll to said selected at least a portion of said preamble to generated plurality of subsequent preambles.

24. The system according to claim 14, wherein said cyclic shift comprises shifting of data blocks within said selected at least a portion of said preamble.

25. The system according to claim 14, wherein said selected portion of said preamble comprises a long training sequence.

26. The system according to claim 14, wherein each of said generated plurality of subsequent preambles corresponds to one or more spectral energy tone.

27. A non-transitory machine-readable storage having stored thereon, a computer program having at least one code section for processing multiple preambles for a wireless signal, the at least one code section being executable by a machine to perform steps comprising:
   selecting a plurality of training sequence data blocks from a preamble of the wireless signal, each of said selected plurality of training sequence data blocks including a plurality of energy tones; and
   cyclic shifting, in time domain, said selected plurality of training sequence data blocks from said preamble to generate a plurality of subsequent preambles for transmission by at least two of a plurality of antennas, wherein each of said generated plurality of subsequent preambles including said plurality of energy tones.

28. The non-transitory machine-readable storage according to claim 27, wherein said preamble comprises a legacy preamble.

29. The non-transitory machine-readable storage according to claim 27, wherein said preamble comprises an 802.11 (n) preamble.

30. The non-transitory machine-readable storage according to claim 27, wherein said cyclic shifting in said time domain comprises circular shifting.

31. The non-transitory machine-readable storage according to claim 30, wherein said circular shifting comprises forward circular shifting.

32. The non-transitory machine-readable storage according to claim 30, wherein said circular shifting comprises backwards circular shifting.

33. The non-transitory machine-readable storage according to claim 27, comprising code for transmitting said generated plurality of subsequent preambles via a plurality of antennas.

34. The non-transitory machine-readable storage according to claim 33, wherein said generated plurality of subsequent preambles is transmitted in one or more substantially identical frequencies in each of said plurality of antennas.

35. The non-transitory machine-readable storage according to claim 34, wherein each of said generated plurality of subsequent preambles is transmitted in substantially identical periodicity in each of said plurality of antennas.

36. The non-transitory machine-readable storage according to claim 27, comprising code for adding a phase to said selected at least a portion of said preamble to generated plurality of subsequent preambles.

37. The non-transitory machine-readable storage according to claim 27, wherein said cyclic shifting comprises code for shifting of data blocks within said selected at least a portion of said preamble.

38. The non-transitory machine-readable storage according to claim 27, wherein said selected portion of said preamble comprises a long training sequence.

39. The non-transitory machine-readable storage according to claim 27, wherein each of said generated plurality of subsequent preambles corresponds to one or more spectral energy tone.

40. A method for processing a wireless signal, the method comprising:
   performing by one or more processors:
      selecting a plurality of training sequence data blocks from at least a portion of a preamble of the wireless signal, each of said selected portion of said preamble including a plurality of energy tones; and
      cyclically shifting, in time domain, said selected plurality of training sequence data blocks from said at least a portion of said preamble to generate a plurality of secondary preambles for transmission, wherein each of said plurality of secondary preambles including said plurality of energy tones, and are transmitted concurrently with said selected portion of said preamble.

41. A system for processing a wireless signal, the system comprising:
- at least one processor that selects a plurality of training sequence data blocks from at least a portion of a preamble of the wireless signal, each of said selected portion of said preamble including a plurality of energy tones; and
- said at least one processor cyclically shifts in time domain said selected plurality of training sequence data blocks from said at least a portion of said preamble to generate a plurality of secondary preambles for transmission, wherein each of said plurality of secondary preambles including said plurality of energy tones, and are transmitted concurrently with said selected portion of said preamble.

42. A non-transitory machine-readable storage having stored thereon, a computer program having at least one code section for processing multiple preambles for a wireless signal, the at least one code section being executable by a machine to perform steps comprising:
- selecting a plurality of training sequence data blocks from at least a portion of a preamble of the wireless signal, each of said selected portion of said preamble including a plurality of energy tones; and
- cyclically shifting, in time domain, said selected plurality of training sequence data blocks from said at least a portion of said preamble to generate a plurality of secondary preambles for transmission, wherein each of said plurality of secondary preambles including said plurality of energy tones, and are transmitted concurrently with said selected portion of said preamble.

* * * * *